US006682633B1

(12) United States Patent
Xu et al.

(10) Patent No.: US 6,682,633 B1
(45) Date of Patent: Jan. 27, 2004

(54) APPARATUS FOR COCURRENT FRACTIONAL DISTILLATION

(75) Inventors: Zhanping Xu, Amherst, NY (US); Dennis H. Bielinski, Williamsville, NY (US)

(73) Assignee: UOP LLC, Des Plaines, IL (US)

( * ) Notice: Subject to any disclaimer, the term of this patent is extended or adjusted under 35 U.S.C. 154(b) by 437 days.

(21) Appl. No.: 09/748,356

(22) Filed: Dec. 22, 2000

(51) Int. Cl.[7] ............... B01D 3/14; B01D 3/42; B01F 3/04
(52) U.S. Cl. ............ 203/1; 202/153; 202/158; 202/197; 203/40; 203/99; 203/100; 261/75; 261/113; 261/114.1; 196/111
(58) Field of Search ............... 202/153, 155, 202/158, 197; 203/1, 40, 99, 100; 196/111; 96/188; 261/75, 113, 114.1, 146

(56) References Cited

U.S. PATENT DOCUMENTS

| | | | | |
|---|---|---|---|---|
| 4,361,469 A | | 11/1982 | Trutna | 203/99 |
| 4,750,975 A | * | 6/1988 | Parker et al. | 202/154 |
| 4,752,307 A | | 6/1988 | Asmus et al. | 55/73 |
| RE33,444 E | * | 11/1990 | Lerner | 261/114.1 |
| 5,244,604 A | * | 9/1993 | Miller et al. | 261/97 |
| 5,318,732 A | * | 6/1994 | Monkelbaan et al. | 261/114.1 |
| 5,554,329 A | * | 9/1996 | Monkelbaan et al. | 261/98 |
| 5,683,629 A | | 11/1997 | Konijn | 261/79.2 |
| 5,690,708 A | | 11/1997 | Danckaarts et al. | 55/257.2 |
| 5,707,563 A | * | 1/1998 | Monkelbaan et al. | 261/98 |
| 5,798,086 A | | 8/1998 | Erickson | 422/211 |
| 5,837,105 A | | 11/1998 | Stober et al. | 203/40 |
| 5,885,488 A | | 3/1999 | Konijn | 261/79.2 |
| 6,059,934 A | | 5/2000 | Stober et al. | 203/40 |
| 6,224,043 B1 | * | 5/2001 | Fan et al. | 261/114.1 |

* cited by examiner

Primary Examiner—Virginia Manoharan
(74) Attorney, Agent, or Firm—John G. Tolomei; Frank S. Molinaro; David J. Piasecki

(57) ABSTRACT

A modular apparatus for fractional distillation and other forms of vapor-liquid contacting is presented. The apparatus performs cocurrent contacting of vapor and liquid in a number of identical structural units which are placed in horizontal layers in a column or other enclosure. The structural units, or modules, are horizontally spaced apart in each layer to provide spaces for the downcomers from the modules of the next higher layer. The downcomers deliver the liquid to one of two inclined contacting channels, with the contacting channels discharging the vapor and liquid into separation chambers at the top of the module. Vapor flows upward from the separation chambers to the contacting channel of the next higher module and liquid flows down through a single central downcomer to the next lower contacting channel.

15 Claims, 4 Drawing Sheets

APPARATUS FOR COCURRENT FRACTIONAL DISTILLATION

BACKGROUND OF THE INVENTION

1. Field of the Invention

The invention relates to an apparatus useful for performing fractional distillation or other forms of vapor-liquid contacting. The invention more specifically relates to a process and apparatus providing a high capacity and high efficiency cocurrent flow fractionation apparatus useful in fractional distillation columns to separate volatile chemicals such as hydrocarbons.

2. Related Art

Fractional distillation has traditionally been conducted in counter current contacting devices having an overall downward liquid flow and upward vapor flow. At some point in the apparatus the vapor and liquid phases are brought into contact to allow the vapor and liquid phases to exchange components and approach equilibrium with each other. The vapor and liquid are then separated, moved in the appropriate direction and contacted again with another quantity of the appropriate fluid. Except for in a few exceptions such as noted below, in the traditional stage contacting vapor and liquid are contacted in a cross flow arrangement at each stage. The subject apparatus differs from traditional multi-stage contacting systems in that while the overall flow in the apparatus continues to be countercurrent, each stage of actual contacting between the liquid and vapor phases is performed in a cocurrent mass transfer zone.

Cocurrent vapor-liquid contacting devices are described in the patent literature. For instance, U.S. Pat. No. 4,752,307 issued to G. Asmus et al. and U.S. Pat. No. 5,885,488 to G. Konijn present devices in which rising gas lifts liquid into a cocurrent contacting zone. A swirl imparting means helps separate the two phases after contacting. U.S. Pat. No. 5,683,629 issued to G. Konijn also describes a fractionation tray in which the vapor passes upward through a swirl imparting means cocurrent to liquid.

U.S. Pat. No. 4,361,469 issued to W. R. Trutna also presents an apparatus for use in fractionation or absorption in which cocurrent vapor and liquid flow is used in the contacting step. The apparatus employs tray-like devices to intermix the liquid into rising vapor, with downcomers at the edge of the trays carrying the liquid downward from separators located over the trays.

U.S. Pat. No. 5,690,708 issued to A. Danckaarts et al. describes a fractionation tray in which the vapor enters a contacting section horizontally through porous walls and then passes upward with entrained liquid into a separation section.

U.S. Pat. No. 5,798,086 issued to D. C. Erickson presents a fractionation tray having adjacent cocurrent risers and downcomers spread across the tray.

U.S. Pat. No. 5,837,105 and related U.S. Pat. No. 6,059,934 issued to B. K. Stober et al. disclose a fractionation tray having multiple cocurrent contacting sections spread across the tray. Liquid emanating from a central downcomer is entrained in vapor rising through vapor openings and passed into one of two de-entrainment devices. The liquid from two de-entrainment devices then flows into a downcomer.

BRIEF SUMMARY OF THE INVENTION

The invention is a novel high capacity and high efficiency vapor-liquid contacting apparatus for use in fractionation columns. The apparatus is characterized by a modular rather than tray-like construction, with the symmetrical modules interlocking to form two cocurrent vapor-liquid riser channels which carry fluid up to one of the two vapor-liquid separators of each module. These separators partition the vapor and liquid such that the vapor and liquid can separately flow upward and downward respectively after being contacted. The liquid flows into a V-shaped downcomer, with one wall of the downcomer also forming a wall of the cocurrent vapor-liquid flow channel. Variations relate to the design of the separators, channels and overall apparatus.

One broad embodiment of the invention may be characterized as a vapor-liquid contacting apparatus useful for performing fractional distillation of a multi-component feed stream, which apparatus comprises an apparatus for performing vapor-liquid contacting, including fractional distillation of a multi-component feed stream, which apparatus comprises an external, substantially enclosed, vertical outer vessel; a plurality of contacting modules adapted to be placed in layers in the vessel, with each module having an upper end and a lower end and comprising a tapered downcomer located at the lower end of the module and formed from two opposing inclined walls, the downcomer having a liquid outlet opening at its lower end and an inlet opening at its upper end; horizontal extension plates projecting outward from the upper end of each opposing wall; a pair of vapor-liquid separation chambers located at the upper end of each module with one chamber being located above each of the horizontal extension plates, with the chambers being spaced apart on opposite sides of the module to form an intermediate fluid transfer volume located above and communicating with the inlet opening of the downcomer, and with each of the chambers having an outlet surface facing the fluid transfer volume and an opposing inlet surface; and, substantially imperforate walls extending upward from the horizontal extension plates to the vapor-liquid separation chambers; with the modules being stacked in horizontal layers having the modules spaced apart horizontally, and with the downcomers of each upper layer of modules extending downward into a space between two adjacent modules of a lower level of modules to define two vapor-liquid contact channels leading to the inlet surface of the separation chambers of the upper layer of modules.

DETAILED DESCRIPTION AND PREFERRED EMBODIMENTS

Figure 1:
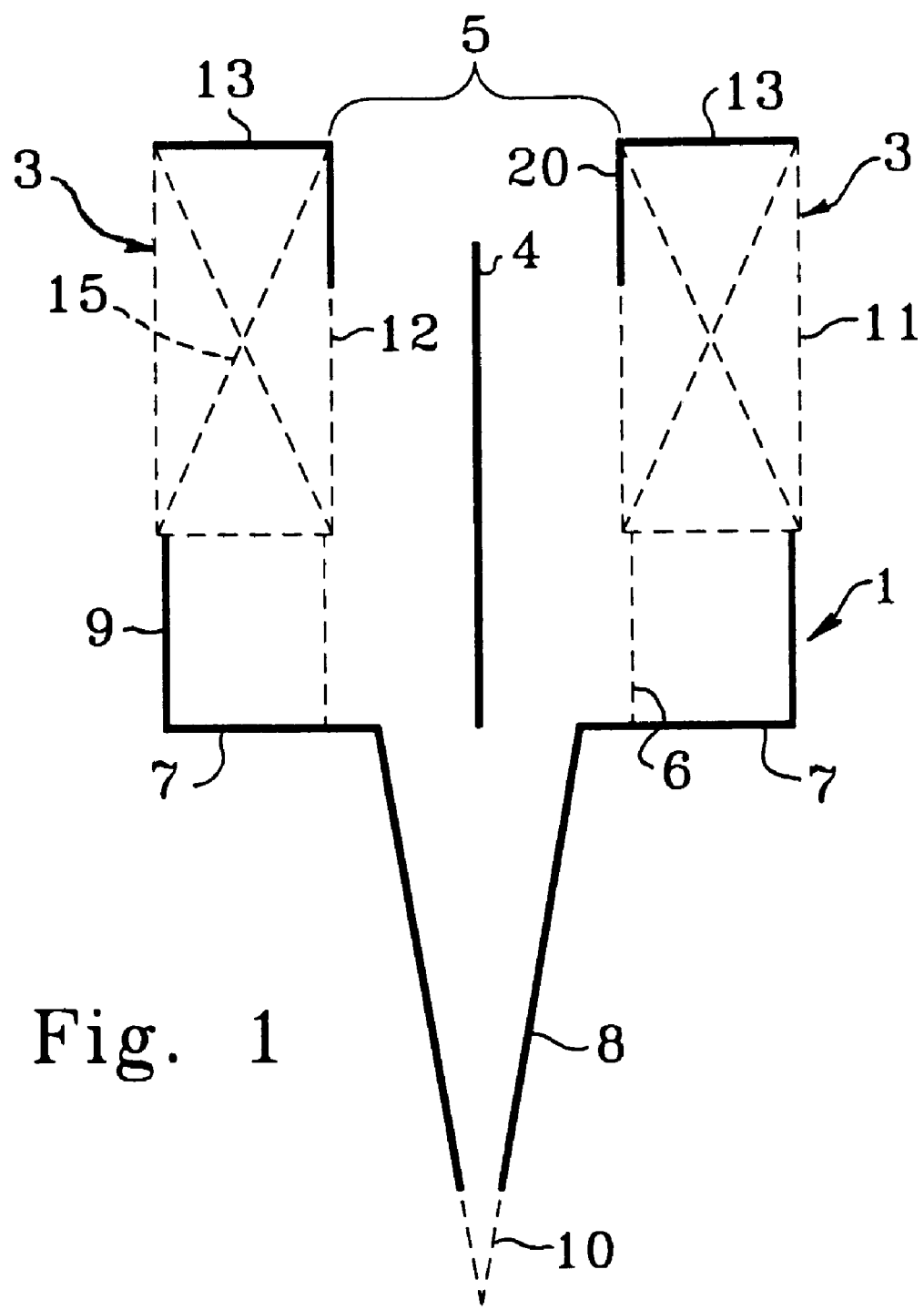
FIG. 1 shows a side view of a single cocurrent contacting module of the subject invention.

Vapor-liquid contacting devices, such as fractionation trays, are employed to perform an almost endless variety of separations in the petroleum and petrochemical industries. Fractionation trays are used, for example, in the separation of many different hydrocarbons such as paraffins, aromatics and olefins. Trays are used to separate specific compounds such as different alcohols, ethers, alkylaromatics, monomers, solvents, inorganic compounds, atmospheric gases, etc. and in the separation of broad boiling mixtures such as petroleum derived fractions including crude oil, naphtha and LPG. Vapor-liquid contacting trays are also used to perform gas processing, purification and absorption. This great utility has led to the development of a wide variety of trays and other contacting devices having differing advantages and disadvantages.

Fractionation trays and packing are the predominant form of conventional fractional distillation apparatus. They are widely used in the petrochemical and petroleum refining industries to promote the multistage vapor-liquid contacting performed in fractionation columns. The normal configuration of a fractionation column includes about 10 to 120 individual trays. Often the structure of each tray in the column is the same, but if conventional multi-pass trays are used, the structures may alternate on vertically adjacent trays. Trays are mounted horizontally at uniform vertical distances referred to as the tray spacing of the column. This distance may vary within different sections of the column but is normally constant. The trays are often supported by a ring welded or bolted to the inner surface of the column.

During the fractional distillation process using conventional trays, vapor generated at the bottom of the column rises through a large number of small perforations spread over the decking area of the tray, which supports a quantity of liquid. The passage of the vapor through the liquid generates a layer of bubbles referred to as froth. The high surface area of the froth helps to quickly establish a compositional equilibrium between the vapor and liquid phases on the tray. The froth is then allowed to separate into vapor and liquid. During the mass transfer in the froth the vapor loses less volatile material to the liquid and thus becomes slightly more volatile as it is forced upward through each tray. Simultaneously the concentration of less volatile compounds in the liquid increases as the liquid moves down by gravity from tray to tray. The liquid separates from the froth and travels downward to the next lower tray. This continuous froth formation and vapor-liquid separation is performed on each tray. Vapor-liquid contactors therefore perform the two functions of contacting the rising vapor with liquid and then allowing the two phases to separate and flow in different directions. When the steps are performed a suitable number of times on different trays, the process can lead to highly effective separation of chemical compounds based upon their relative volatility.

Many different types of vapor-liquid contacting devices including structured packing and trays have been developed as a result of the desire to improve equipment having this great utility in the petroleum refining, chemical and petrochemical industries. Different apparatus tends to have different advantages. For instance, multiple downcomer trays have high vapor and liquid capacities and the ability to function effectively over a significant range of operating rates. Structured packing tends to have a low pressure drop making it useful in low pressure or vacuum operations. Two very important characteristics of vapor-liquid contacting equipment in which improvement is always sought are capacity and efficiency. Cocurrent contacting of the vapor and liquid phases is believed one method of achieving high capacity and mass transfer efficiency.

It is therefore an objective of this invention to provide an apparatus for use in a fractionation column having a high capacity. A further objective is to provide a high capacity cocurrent contacting apparatus having high efficiency. It is a specific objective of the invention to provide an improved cocurrent vapor-liquid contacting apparatus. It is a further objective of the subject invention to provide a process for separating volatile chemical compounds by fractional distillation using a cocurrent contacting apparatus.

The subject invention achieves these objectives by the use of a unique mechanical arrangement which can be characterized as comprising a plurality of interlocking vapor-liquid contacting modules. Each of the modules contains two vapor-liquid separators and a downcomer and has defined internal fluid pathways. The modules interlock to provide concurrent flow channels (risers) delivering a vapor-liquid mixture to the separators.

Referring now to the Drawing, FIG. 1 shows details of a basic module design according to the invention. This figure is presented as it is believed valuable for purposes of description and understanding of the overall invention to first isolate a single module from the more complex pattern which results when several modules are stacked into the interlocking structure in which they are actually used. The single cocurrent contacting module 1 according to the subject invention comprises a pair of vapor-liquid separation chambers 3 mounted upon horizontal downcomer wings or extension plates 7 through the use of one or more vertical support members. The horizontal plates 7 are preferably attached to the upper end of the downcomer walls but can be separate plates held in place by fasteners e.g. bolts or welding. Preferably they are integral to the downcomer. The lowermost portion of the module 1 comprises a tapered downcomer 8. As shown in the figure, the downcomer is preferably formed by two inclined sidewalls providing a V-shaped downcomer when viewed from the end. Liquid outlets 10 are provided at the bottom of the downcomer for discharging liquid to the next lower contacting module. The overall symmetrical structure of the module also includes an open fluid transfer volume 5 located between the two vapor-liquid separation chambers 3. This volume 5 is between the outlet surfaces 12 of the chambers 3. Preferably a vertical baffle 4 bisects the volume 5. The primary purpose of the baffle 4 is to intercept vapor emanating from the outlets of the separation chambers 3 and, in general, reduce any tendency of the emerging fluids to interfere with each other in the intermediate volume 5.

The structure of the contacting module shown in FIG. 1 includes a substantially imperforate top or cover plate 13 which encloses the top end of the vapor-liquid separation chambers 3. Preferably this imperforate wall continues downward along the outlet surface 12 a short distance such that fluids are forced to turn downward within the vapor-liquid separation chamber. The fluids in this case must exit at a level below the top edge of the vertical baffle 4. In this manner any vapor or liquid which enters the inlet 11 of either vapor-liquid separation chamber must exit from the chamber through either the vertical outlet surface 12 or the horizontal bottom surface of the chamber. Both of these surfaces allow free unrestricted flow of vapor and liquid from the separation chamber. During proper operation liquid will exit the bottom surface of the vapor-liquid separation chamber 3 and vapor will exit the vertical outlet 12. The vapor will tend to rise going above the baffle 4 and exiting the top of the module. The vapor from the two separators can admix at this point. Liquid will flow downward normally through the porous or perforated vertical support member 6 and into the downcomer 8. Member 6 may also be in the form of a leg or brace which allows the liquid to flow around it.

FIG. 1 only presents the preferred elements of the invention. It does not illustrate various accessory elements which would be utilized to provide support and/or strength to the overall apparatus. For instance, some means must be provided to retain the vertical baffle 4 in position. This may be achieved by other baffles extending to the downcomer plates 7 and/or to the vapor-liquid separation chambers 3. Alternatively, the baffle 4 could be attached to a perpendicular baffle which extends downward into the downcomer 8 and is fastened thereto.

The view in FIG. 1 is the view as seen looking horizontally along the length of the module. While the modules can be quite short, it is anticipated that they will be greater in length than in width, with the width being measured as the distance between the two inlet surfaces 11 of the vapor-liquid separation chambers. The length of the modules is dictated by the internal dimension of the column in which it is placed. A single module may extend across the width of the column or the module may be broken into two or more individual sections which join together, end to end, to extend across the column. The modules may be fabricated to be self supporting or they may be supported through structural members extending across the internal volume of the column.

Figure 2:
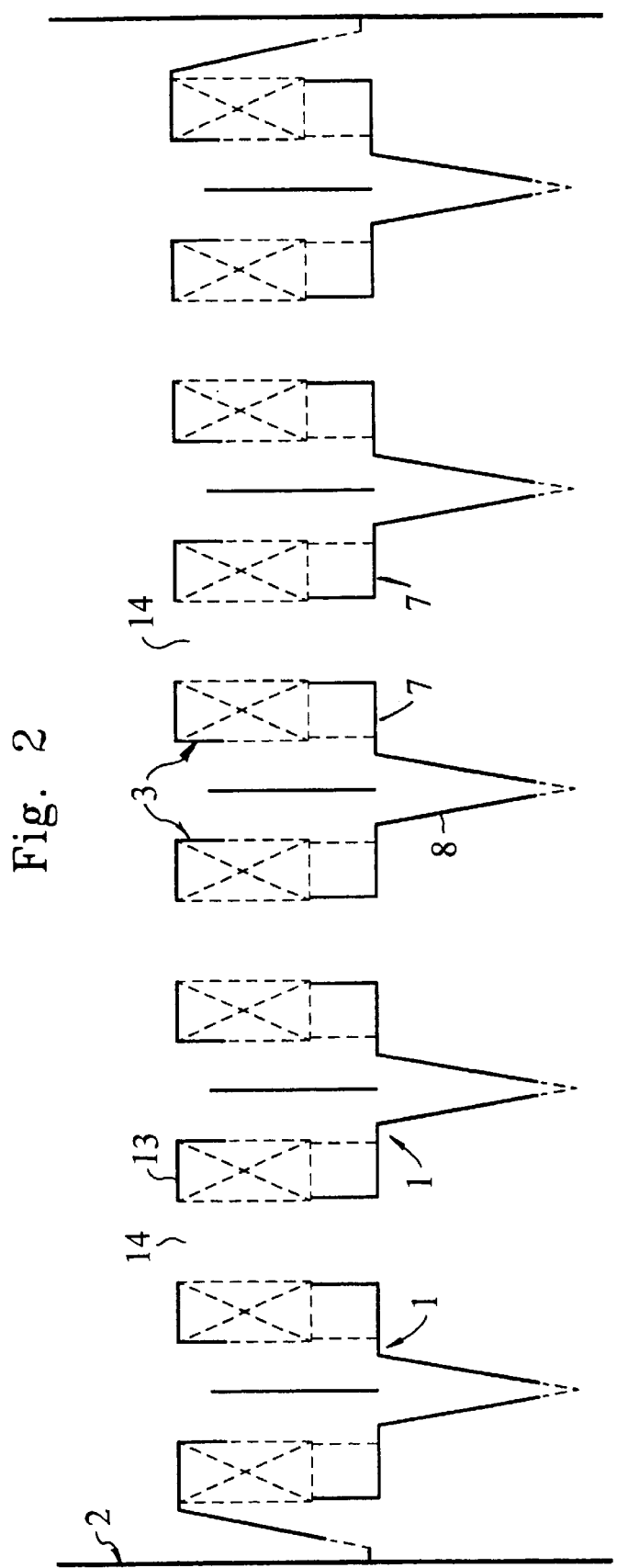
FIG. 2 is a side view of a horizontal layer of five modules in a surrounding column 2.

FIG. 2 illustrates the placement of five vapor-liquid contacting modules 1 in a single row or layer extending across a column 2. An important fact to be noted from this figure is that the modules are spaced apart at uniform distances. The next row of modules would be placed such that the downcomers of this upper row of modules extend into the spaces 14 between the modules of the lower row. This figure also illustrates a preferred arrangement for use at the end of each row of modules where it adjoins the column 2. This arrangement is the provision of an inclined wall which is equivalent to one-half of a downcomer. A further feature illustrated in this figure is the imperforate cover plates 13 which prevent the passage of vapor or liquid out of the top of the vapor-liquid separation chambers 3. It may be noted that the placement of a module of similar design into the space 14 would result in the horizontal wings or extension plates 7 of the upper modules also covering the top of the vapor-liquid separation chambers. A separate imperforate plate 13 may not be required if the extension plate 7 adequately performs the function of sealing the top of the vapor-liquid separation chamber 3.

Figure 3:
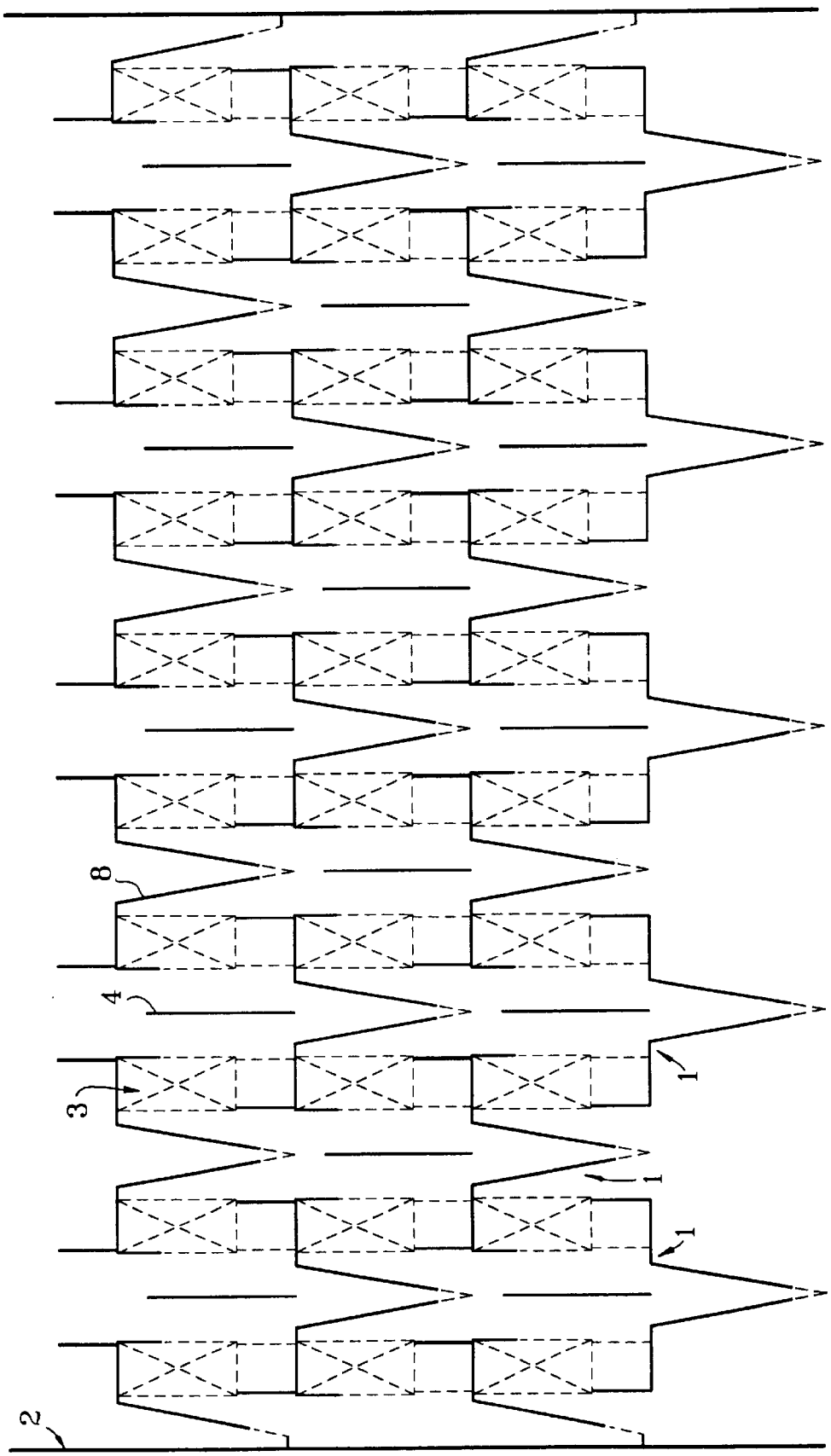
FIG. 3 is a side view of a section of a fractionation column containing three horizontal layers of cocurrent contacting modules.

FIG. 3 illustrates three horizontal rows of contacting modules 1 extending across a column 2. This figure illustrates that the contacting modules in vertically adjacent rows are horizontally offset. The downcomers of the second row from the bottom extend into an open spaces located between the outlet surfaces of two disengagement chambers 3 of adjacent contacting modules of the bottom row.

Figure 4:
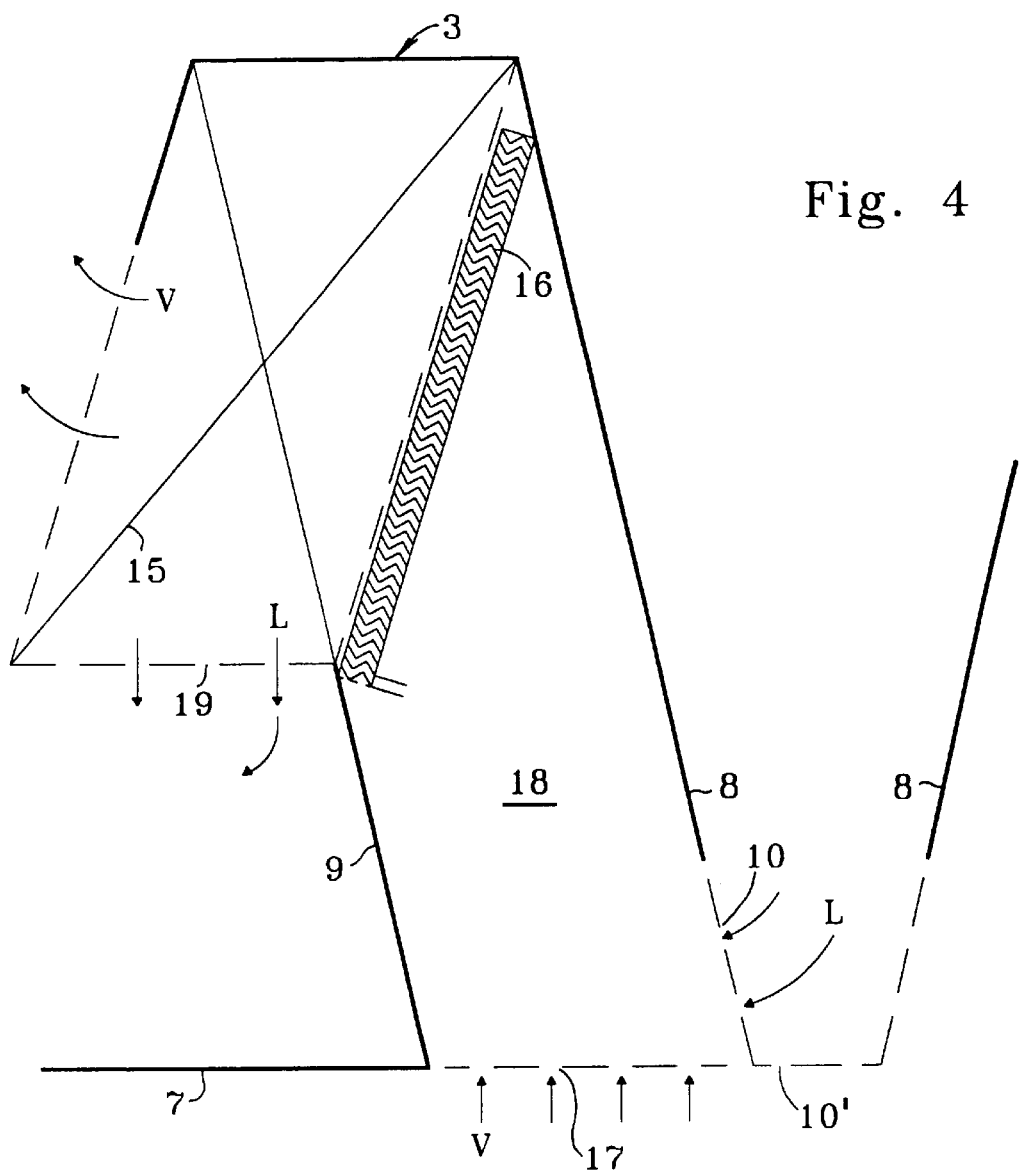
FIG. 4 is an expanded view of a portion of a cocurrent contacting module showing alternative structures.

FIG. 4 is a detailed view of a portion of a contacting module. This larger view allows a clearer depiction of structural details of the apparatus but the primary function of this figure is to illustrate certain alternative structures and elements. The figure is also embellished by the provision of arrows indicating the direction of liquid and vapor flow in the apparatus. When the apparatus is in use, the liquid descending from above will accumulate in a lower portion of the downcomer 8 after disengaging from vapor. The liquid then exits the bottom of the downcomer and is brought into contact with rising vapor. In the figure the liquid flow is shown by the arrows bearing the caption "L." In the depicted apparatus the largest opening for liquid flow is in the sidewalls of the downcomer. Therefore, the majority of the liquid will flow horizontally through the bottom of the downcomer sidewalls through the perforations provided. Some liquid may also exit through the optional openings 10' at the bottom of the downcomer. The liquid leaving the downcomer is captured in the upflowing vapor with the direction of vapor flow being shown by the arrows labeled "V." The vapor flow rate is sufficient to transport the liquid upward in the cocurrent vapor-liquid contacting channel 18.

In the apparatus depicted in FIG. 4 the imperforate support member 9 is inclined at an angle such that it is parallel to the opposing downcomer wall. This angle can be in the broad range of about 5 to 40 degrees from vertical, but is preferably between 5 and 20 degrees. The inclined cocurrent vapor-liquid contacting channel 18 of this embodiment is therefore of uniform cross section rather than tapered as shown in FIG. 3. For purposes of this description, the top of this inclined contacting channel is defined as the bottom of the inlet to the vapor-liquid separator even though portions of the channel extend above this point.

To increase the size of the upper portion of the parallel wall vapor-liquid contacting channel, the vapor-liquid separation, or disengagement, chamber 3 is inclined at an angle to vertical, but in an opposite direction to the downcomer wall 8. Other than a change in orientation, the internal structure and relative size of the: separation chamber 3 is unchanged. Two other optional features illustrated in FIG. 4 are the grid 17 across the bottom of the cocurrent contacting channel 18 and a porous mesh blanket 16 across the inlet surface of the separation chamber 3. Both the grid 17, which may resemble the decking used on a typical conventional fractionation tray and the porous blanket 16 are intended to provide more uniform flow of both vapor and liquid in the contacting channel and into the separation chamber 3. The grid will be highly perforated to minimize pressure drop. The porous blanket 16 may also improve separation by coalescence of liquid droplets. The grid 17, the porous blanket 16 and other porous media, such as random or structured packing may be placed within the contacting channel in various orientations to improve vapor-liquid contacting and distribution.

As an alternative structure to that shown in FIG. 4 the size of the contacting channel may be further enlarged by using a support member 9 which is vertical or inclined in the opposite direction. To accommodate this the bottom connection point between the support member 9 and the horizontal plate 7 is moved inward, to the left in this instance. This will form a support angle increasing the mechanical strength of the structure.

The mixed phase fluid flow of vapor and entrained liquid droplets entering the separation chamber 3 impacts vapor-liquid separation media which may be of conventional design. The liquid will tend to collect on the media and run downward along the surface of the media 15 to the bottom of the separation chamber 3. The media is of complicated three dimensional structure and is represented by the "x" across the separation chamber 3. The liquid will emerge from the bottom surface of the separation chamber 3. Likewise, the vapor is allowed to freely flow out the inclined outlet surface of the separation chamber 3. These flows are again shown by the arrows captioned "L" and "V." The liquid will therefore descend to a space located under the separation chamber 3 and will flow to the left to the downcomer, not shown, of this module. The vapor will rise out of the module and flow into the cocurrent contacting channel of the next higher module.

Figure 5:
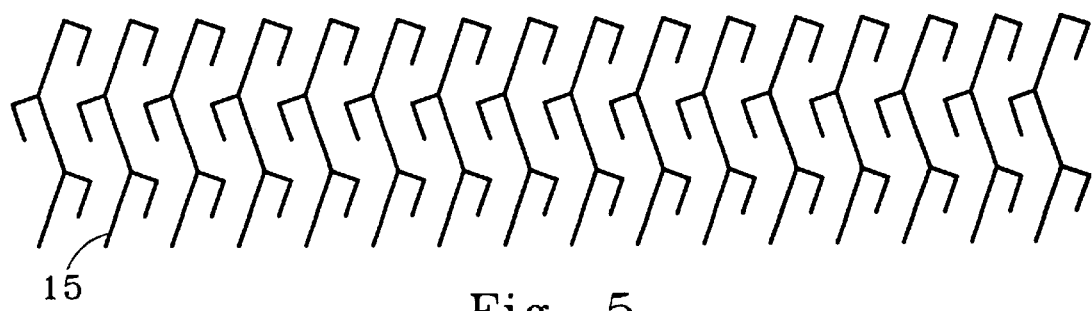
FIG. 5 is a side view of one form of vapor-liquid separation media 15 suitable for use in the vapor-liquid separation chambers.

FIG. 5 illustrates one possible configuration of the vapor-liquid separation media or grid 15 which is employed in the disengaging chambers 3. This view is the view seen looking from the top or the bottom of the media. In the grid orientation depicted in the drawing the direction of flow would be in from the bottom and out through the top. The structure is chosen such that the liquid droplets which are entrained in the flowing vapor are caused to impact upon a surface. Upon impact they tend to collect and run downward emerging from the bottom of the media.

As pointed out above, FIG. 1 and the other figures do not illustrate all of the optional additions to the basic apparatus. The number of such additions is lengthy since it includes additional supports, fasteners, braces, etc. of a general mechanical nature which can be varied almost endlessly. One specifically preferred optional addition is the placement of "stiffener" plates comprising a properly shaped metal wall or brace about 3 to 10 cm high across the space between two opposing walls within the modules. These may be placed in numerous locations and are preferably perpendicular to these walls although they could be inclined. Such stiffeners are shown in prior art references located at the mouth of downcomers and extending down into the downcomers. This is a preferred location in the subject apparatus. As the downcomer is tapered, the stiffener is also tapered. Another preferred location for placement of a stiffener is under the vapor-liquid separators 3 extending downward to the horizontal plates 7 extending outward from the mouth of the downcomer. These stiffeners may be attached to the separator 3 and the plate 7. They may also be attached to the outer support member 9.

Vertical stiffener plates may also be used to support the vertical baffle 4, with both this stiffener and the baffle being notched to allow them to interlock in an X-shaped pattern. A single stiffener plate extending between the two outer support members 9 or two stiffeners each attached to one of the plates 9 can be employed. The stiffener plate(s) would be attached to the lower portion of the perpendicular baffle 4. In an alternative design the stiffener plates can be attached to the upper portion of the baffle 4. This stiffener plate could extend between the vertical wall 20 located along the top portion or the outlet surface of the separator 3. As the wall 20 is optional, even though it is preferred, this stiffener can be attached directly to vanes of the media in the separator 3.

The stiffener plates are mainly envisioned as useful in increasing the structural strength of the module. However, they will be in vapor or liquid flow paths and can be useful in smoothing and channeling the flow of vapor and liquid. As primarily structural elements, the stiffeners will ordinarily be spaced too far apart to have much impact on vapor-liquid contacting or separation as through providing additional surface area. Their secondary functionality will therefore be limited to supporting other ports of the module such as the baffle 4.

Each element added to the module increases the cost of the module, and it is therefore preferred to simplify the structure of the module and to minimize the number of components in the module and their complexity.

The module can be fabricated from a number of long metal plates which are welded or bolted together. It is envisioned that production costs will be lower if large portions of a module are formed by multiple bending steps on a single piece of metal. For instance, reference to FIG. 1 will show that the downcomer 8, horizontal extension plates 7 and vertical support members 9 can all be formed from a single piece of prepunched metal. If desired this single piece of folded metal could also be formed to encompass a perforated horizontal plate under the vapor-liquid separator 3 and extend downward to the plate 7 as the inner support member. Another example of using a single piece of metal to form an extensive portion of the module is the use of single piece of metal to form all four surfaces, both perforate and imperforate, which may enclose the vapor-liquid separator 3. The separation media 15 can then be inserted through the end of the module. In this instance the inner support member 6 could also be part of this same piece of folded metal.

The ends of the module, that is the terminal portions of the module which face the inner surface of the wall of the enclosing structure, should be sealed to prevent unintended vapor or liquid bypassing of the contacting apparatus. The ends of the module are preferably tapered or curved to conform to the curvature of the enclosing structure. Alternately, the ends of the modules could be flat and a horizontal imperforate extension plate span the gap from the module to the enclosing structure.

Those skilled in the art will recognize that there are many more variations which can be made to the basic arrangement of the subject invention. For instance, the angle of incline of the downcomer walls can be varied significantly, but the use of an arrangement resembling that shown in the drawing is preferred. That is the angle of the downcomer sidewall should be no more than about 30° from vertical. Another inclined surface is that of the vertical walls of the vapor-liquid disengagement grid shown in FIG. 5. The preferred angle is similar to that shown which is 20° degrees. This angle can vary between about 10 to about 35 degrees. The angle is measured from a plane along the major axis of the grid. Obviously there are many possible variations to the design of this grid. The important factor is its effectiveness in separating entrained liquid from a flowing vapor stream. Presently this is believed related to the provision of the multiple obstructions in the vapor flow which cause the liquid droplets to impact a solid surface. The dead end nature of the obstructions shown in the figure may lead to the formation of relatively quiescent regions which also promote liquid separation. For both of these reasons, a grid having sharp bends is believed preferable to one having shallow bends or smooth curves. Suitable grids are available commercially.

Another variation is that the subject modules may be used in conjunction with conventional trays either above or below or interspersed with sections of column using the subject apparatus. A further variation relates to the shape of the surrounding vessel or column. Although most all fractionation columns are cylindrical, this is not dictated by this apparatus and it can function equally well, if not better, in a column having a rectangular or square cross section. The subject modules may be used in groupings on the order of 4–8 modules high, with each grouping being supported from below by a structural framework. Alternatively the modules may possibly be fabricated to be strong enough to support the weight of a stack of modules equal to the total number of module layers used in a short column. It is envisioned that a fractionation column would contain from about 10 to about 150 or more layers of the modules. The design of the modules is expected to be essentially uniform throughout the column although it may vary to accommodate changes in fluid flow rates in different parts of the column.

An apparatus embodiment may accordingly also be characterized as a fractionation apparatus comprising an apparatus for performing vapor-liquid contacting within an enclosing outer structure, which apparatus comprises a plurality of contacting modules arranged in flat, superposed layers, with each contacting module comprising two partially enclosed vapor-liquid separation chambers, and a single tapered downcomer having two inclined sidewalls;

with the contacting modules in a layer being spaced apart to provide an open space between them, the downcomer of the contacting modules of the next higher layer extending downward into said open space and dividing the open space into two vapor-liquid flow channels, with each sidewall of the downcomer forming one wall of a vapor-liquid contacting channel; and with the vapor-liquid separation chambers having a vapor outlet surface and a substantially parallel inlet surface, the vapor outlet surface facing into a fluid transfer volume located between the two vapor-liquid separation chambers of a module; each of the vapor-liquid separation chambers being supported above the top of the downcomer by an imperforate vertical outer wall and an inner member; and vapor and liquid flow pathways which intersect at the bottom of the vapor-liquid contacting channels, which contacting channels begin at an outlet in a bottom portion of a downcomer and extend upward to the inlet surface of a vapor-liquid separation chamber.

The figures in the Drawing are only representations of actual commercial apparatus and are not to scale. The size of various components of the apparatus will be set by the expected maximum fluid flow rates which the apparatus must accommodate. To provide a guideline for the design of the apparatus it is noted that the mouth of the downcomer will typically have a width of about 8 to about 25 cm., with a range of 10 to 15 cm being preferred. The vertical distance between equivalent points on two layers of apparatus is within the range of about 25 to 75 cm with a distance of from about 30 to about 45 cm being preferred. The height of the downcomer is similar to or larger than one-half a module. The vapor-liquid separation chambers 3 preferably are about 7 to about 20 cm wide measured between the vertical inlet and outlet surfaces 11 and 12. The separation chambers preferably have a height equal to about ⅔ to ⅘ of the vertical spacing of the apparatus modules.

The porous mesh blanket layer covering the inlet to the separation chambers, which marks the termination of the cocurrent vapor-liquid "riser", can vary in thickness from about 0.1 to about 1.5 cm. The use of this porous blanket has been found to reduce liquid entrainment especially during operation at higher F-factors. The porous blanket can be of conventional mesh material used for liquid droplet de-entrainment or so called "mist eliminators". It will typically comprise very loosely woven metal strands forming a high surface area low pressure drop blanket. The mesh blanket is for fine droplet coalescence and liquid distribution to the separator. An alternative construction is to mount the mesh in an indentation in the disengagement grid or totally inside the chamber in a dedicated space between the contacting channel and the start of the grids.

The materials of construction of the subject apparatus can be those which are customarily used for the manufacture of fractionation trays and packing materials for the intended separation. Trays and packing are usually made of metal of standard thickness, ranging from about 7 gauge to about 30 gauge. The thickness of the metal will vary in part depending on the strength of the metal and its composition, with strength being the prime controlling factor. The grid within the separators can be 25 gauge or higher. The metal may range from carbon steel to stainless steel in more corrosive situations, or other metals including titanium. Vapor-liquid contactors can also be fabricated from polymeric materials including reinforced plastics. The apparatus may also be fabricated from a combination of materials although it is preferred to employ only one material, with this material being a standard gauge metal.

A further variation which is possible with the subject apparatus is the placement of catalyst at various points within the apparatus such as within the downcomer or at other locations in the void volumes used to transport vapor or liquid in order to perform catalytic distillation. The best placement of the catalyst will be determined in part by whether the desired reaction occurs in the liquid or vapor phase. Placement of catalyst in the cocurrent vapor-liquid channel (riser) is not preferred. The catalyst can also be applied to the various elements of the module such as the vapor-liquid separation media 15. The subject apparatus may also be used in conjunction with beds of catalyst located outside of the distillation column proper to simulate a catalytic distillation effect.

A process embodiment of the subject invention may accordingly be characterized as a process for fractional distillation which comprises passing a first vapor stream upward through a first inclined contacting channel at a velocity sufficient to entrain liquid droplets emanating from an outlet at the bottom of a first downcomer, with the first vapor stream and entrained droplets rising at an angle from vertical of from about 5 to 30 degrees; directing the first vapor stream and entrained droplets into the inlet surface of a first vapor-liquid separation chamber with the first vapor-liquid chamber being part of a symmetrical module which comprises a second vapor-liquid separation chamber; decreasing the average velocity of the first vapor stream, and passing the first vapor stream through a liquid disengagement grid within the first vapor-liquid separation chamber and removing entrained liquid droplets; removing a second vapor stream horizontally from the first vapor-liquid separation chamber and removing liquid vertically from a bottom surface of the first vapor-liquid separation chamber; passing the liquid removed from the first separation chamber downward into a second downcomer; and passing the second vapor stream upward into a second inclined contacting channel.

Operating conditions for a fractionation column are confined by the physical properties of the compounds being separated in the column. Operating temperature and pressure of a column may be varied within these confines to minimize the operating cost of the column and accommodate other commercial objectives. The operating temperature may range from very low temperatures used in cryogenic separations to temperatures which challenge the thermal stability of the compounds. Conditions suitable for the subject process therefore include a temperature in the broad range of from about −50 to about 400° C. The column must be operated at a pressure sufficient to maintain at least a portion of the feed compounds present as a liquid. High pressures require a much more costly outer vessel and accessory equipment including reboilers and overhead condensers. It is, therefore, generally desired to operate a column in the lower portion of the range of possible operating pressures unless it adversely effects the operation of the column. Fractionation pressures may range from subatmospheric pressure to a pressure up to about 500 psig.

What is claimed is:

1. An apparatus for performing cocurrent vapor-liquid contacting, including fractional distillation of a multicomponent feed stream, which apparatus comprises:

a) an external, substantially enclosed, vertical outer vessel; and
   b) a plurality of contacting modules structured to be placed in layers in the vessel, with each module having an upper end and a lower end and comprising:
      i. a tapered downcomer located at the lower end of the module and formed from two opposing inclined walls, the downcomer having a liquid outlet opening at Its lower end and an inlet opening at its upper end;

ii. horizontal extension plates projecting outward from the upper end of each opposing inclined wall;

iii. a pair of vapor-liquid separation chambers located at the upper end of each module, with one chamber being located above each of the horizontal extension plates, the chambers being spaced apart on opposite sides of the module to form an intermediate fluid transfer volume located above and communicating with the inlet opening of the downcomer, each of the chambers having an outlet surface facing the fluid transfer Volume and an opposing inlet surface; and iv. substantially imperforate walls extending upward from the horizontal extension plates to the vapor-liquid separation chambers;

wherein the modules are stacked in horizontal layers having the modules spaced apart horizontally, and with the downcomers of each upper layer of modules extending downward into a space between two adjacent modules of a lower level of modules to define two vapor-liquid contact channels leading to the inlet surface of the separation chambers of the lower layer of modules.

2. The apparatus of claim 1 wherein the horizontal extension plates of the downcomer walls are substantially imperforate.

3. The apparatus of claim 1 further comprising a vertical wall bisecting the fluid transfer volume.

4. The apparatus of claim 1 wherein the vapor-liquid separation chambers have an open bottom surface which allows downward liquid flow.

5. The apparatus of claim 1 further comprising a porous mesh blanket fitted across the inlet surface of the vapor-liquid separation chambers.

6. The apparatus of claim 5 wherein the mesh blanket is located within the vapor-liquid separation chambers between the inlet surface of the chambers and a liquid disengaging grid also located within the chambers.

7. The apparatus of claim 1 wherein the substantially imperforate walls extending upward from the horizontal extension plates to the separation chambers are substantially parallel to the nearest downcomer wall of the upper module, whereby the vapor-liquid contact channels have a substantially constant cross-sectional area between the imperforate walls and the inclined downcomer walls.

8. An apparatus for performing concurrent vapor-liquid contacting within an enclosing outer structure, which apparatus comprises:

a.) a plurality of contacting modules arranged in flat, superposed layers, with each contacting module comprising two vapor-liquid separation chambers, and a single tapered downcomer having two inclined sIdewalls; with i.) the contacting modules in a layer being spaced apart to provide an open space between them, the downcomer of the contacting modules of the next higher layer extending downward into said open space and dividing the open space into two vapor-liquid flow channels, the inclined sidewalls of the downcomer each forming one wall of the respective vapor-liquid flow channels;

ii.) the vapor-liquid separation chambers having a vapor outlet surface and a substantially parallel inlet surface, the vapor outlet surface facing an intermediate fluid transfer volume located between the two vapor-liquid separation chambers of a module;

iii) each of the vapor-liquid separation chambers being supported above the top of the downcomer by an imperforate outer wall; and b.) vapor and liquid flow pathways which intersect at the bottom of the vapor-liquid flow channels, which flow channels begin at an outlet in a bottom portion of a downcomer and extend upward to the inlet surface of the vapor-liquid separation chamber.

9. The apparatus of claim 8 further including an inner member comprising a perforated wall supporting the vapor-liquid separation chamber.

10. The apparatus of claim 8 wherein the vapor-liquid separation chambers have an open bottom surface which allows fluid passage.

11. The apparatus of claim 8 further comprising a vertical baffle extending upward through the fluid transfer volume.

12. The apparatus of claim 8 wherein the imperforate outer wall which supports the vapor-liquid separation chamber is substantially parallel to the inclined sidewall of the downcomer whereby the vapor-liquid flow channel is inclined and of substantially uniform cross-sectional area.

13. A process for performing fractional distillation in a vertical column, which process comprises:

a. passing a first vapor stream upward through a first inclined channel at a velocity sufficient to entrain liquid droplets emanating from an outlet at the bottom of a first downcomer, the first vapor stream and entrained droplets rising at an angle from vertical of from about 5 to 30 degrees;

b. directing the first vapor stream and entrained droplets into an inlet surface of a first vapor-liquid separation chamber, the first vapor-liquid separation chamber being part of a symmetrical module, the module comprising a second vapor-liquid separation chamber;

c. decreasing the average velocity of the first vapor stream, and passing the first vapor stream through a liquid disengagement grid within the first vapor-liquid separation chamber and removing entrained liquid droplets;

d. removing a second vapor stream horizontally from the first vapor-liquid separation chamber and removing liquid vertically from a bottom surface of the first vapor-liquid separation chamber;

e. passing the liquid removed from the first vapor-liquid separation chamber downward into a second downcomer; and f. passing the second vapor stream upward into a second inclined channel.

14. The process of claim 13 wherein the second vapor stream is admixed with a third vapor stream, which emanates from the second vapor-liquid separation chamber of the module, and the thus admixed first and second vapor streams are passed upward and divided between inclined channels of two additional modules.

15. The process of claim 13 wherein the first vapor stream and entrained droplets are passed into the first vapor-liquid separation chamber through an inclined inlet which is parallel to an inclined outlet of the vapor-liquid separation chamber.

* * * * *

UNITED STATES PATENT AND TRADEMARK OFFICE
CERTIFICATE OF CORRECTION

PATENT NO.  : 6,682,633 B1
DATED       : January 27, 2004
INVENTOR(S) : Zhanping Xu et al.

It is certified that error appears in the above-identified patent and that said Letters Patent is hereby corrected as shown below:

Column 10,
Line 67, "Its" should be replaced with -- its --

Column 11,
Line 11, "Volume" should be replaced with -- volume --.
Line 44, "concurrent" should be replaced with the word "cocurrent"
Line 50, "sldewalls" should be replaced with -- sidewalls. --

Signed and Sealed this

Thirtieth Day of March, 2004

JON W. DUDAS
*Acting Director of the United States Patent and Trademark Office*